(12) United States Patent
Kim (10) Patent No.: US 12,377,931 B1
(45) Date of Patent: Aug. 5, 2025

(54) TRICYCLE

(71) Applicant: Yong N. Kim, Bayside, NY (US)

(72) Inventor: Yong N. Kim, Bayside, NY (US)

( * ) Notice: Subject to any disclaimer, the term of this patent is extended or adjusted under 35 U.S.C. 154(b) by 0 days.

(21) Appl. No.: 18/762,613

(22) Filed: Jul. 2, 2024

Related U.S. Application Data (63) Continuation-in-part of application No. 18/667,883, filed on May 17, 2024.

(51) Int. Cl.
*B62K 5/06* (2006.01)
*B62K 5/10* (2013.01)

(52) U.S. Cl.
CPC ............... *B62K 5/06* (2013.01); *B62K 5/10* (2013.01); *B62K 2201/04* (2013.01)

(58) Field of Classification Search
CPC ......... B62K 5/06; B62K 5/10; B62K 2201/04
See application file for complete search history.

(56) References Cited

U.S. PATENT DOCUMENTS

| | | | | |
|---|---|---|---|---|
| 3,880,449 A | | 4/1975 | Wada | |
| 3,981,516 A | * | 9/1976 | Haggkvist | B62K 5/02 280/282 |
| 4,429,760 A | * | 2/1984 | Koizumi | B62K 5/027 280/282 |
| 4,634,137 A | * | 1/1987 | Cocksedge | B62M 1/26 280/282 |
| 4,743,102 A | | 5/1988 | Pareigat | |
| 5,678,835 A | * | 10/1997 | Sung | B62K 5/02 280/270 |
| 5,730,453 A | * | 3/1998 | Owsen | B62K 5/02 280/282 |
| 2006/0086555 A1 | * | 4/2006 | Dower | B62K 5/10 280/282 |
| 2015/0329165 A1 | * | 11/2015 | Page | B62K 5/02 180/205.1 |
| 2018/0222545 A1 | * | 8/2018 | Wei | B62K 25/04 |
| 2023/0257055 A1 | * | 8/2023 | Augustin | B62K 5/027 280/212 |
| 2024/0246630 A1 | * | 7/2024 | Raffaelli | B62K 5/01 |

* cited by examiner

*Primary Examiner* — Paul N Dickson
*Assistant Examiner* — Shams Dhanani
(74) *Attorney, Agent, or Firm* — PARK LAW FIRM (57) ABSTRACT

The tricycle has a front wheel attached to a front frame, and a left wheel and a right wheel attached to a rear frame. The front frame is attached to a front connecting frame, and the rear frame is attached to a rear connecting frame. The front connecting frame is rotatably attached to the rear connecting frame to rotate around a longitudinal axis of the rear connecting frame. The tricycle also has a tension device attached to the front frame and to the rear frame to provide elasticity and pull the front frame towards the rear frame. The front of the tricycle tilts to transfer a significant portion of the centrifugal force to the ground during a turn. The optimal performance of the tricycle occurs when the imaginary extension of the longitudinal axis points to the front-wheel-to-ground-contact point on the front wheel.

15 Claims, 5 Drawing Sheets

TRICYCLE

This application is a continuation-in-part application of an earlier filed pending application under 35 U.S.C. § 111 (a), Ser. No. 18/667,883 (the "'883 Application), filed on May 15, 2024, claiming its priority date.

SUMMARY

A tricycle is presented herein. A tricycle provides greater stability to the rider, especially for little children, seniors, or those with impaired dexterity or balance. A tricycle, however, has a drawback compared to a bicycle. The drawback is due to the three-wheeled structure that provides stability, its maneuverability is impaired, especially while making turns. For a tricycle, unlike in a bicycle, the centrifugal force from making turns does not easily transfer to the ground. For a bicycle, the centrifugal force during a turn is better transmitted to the ground because the bicycle and the rider lean to a side for a stable ride. However, for a tricycle, because the tricycle does not lean to a side, the centrifugal force is exerted sideways to the rider and the bicycle, making the tricycle unstable. Therefore, there is a strong need for a tricycle that transfers a greater part of the centrifugal force to the ground than a conventional tricycle does; thus making the tricycle ride more comfortable and safer because the rider (user), as well as the rear wheels, does not have to lean to accommodate the centrifugal force The tricycle presented herein transfers a greater part of the centrifugal force to the ground than a conventional tricycle by enabling the front part of the tricycle to be tilted as with a bicycle during the turn. The tricycle presented herein is designed so that the handle, the head tube, the front fork, the front wheel, and the front part of the frame are tilted (that is, leans) in response to the centrifugal force applied to the tricycle. As these parts of the tricycle tilt (that is, leans) according to the turns being made, a substantial portion of the centrifugal force is transmitted to the ground as a bicycle does.

The tricycle has a front wheel attached to a front frame, and a left wheel and a right wheel attached to a rear frame. The front frame is attached to a front connecting frame, and the rear frame is attached to a rear connecting frame. The front connecting frame is rotatably attached to the rear connecting frame to rotate around a longitudinal axis of the rear connecting frame. The tricycle also has a handlebar rotatably connected to the front frame and a seat connected to the seat tube.

The tricycle also has a seat tube attached to the front connecting frame, wherein a tension device (such as a spring, a shock absorber, or other elasticity providing devices) is attached to the rear connecting frame and to the seat tube. More specifically, the tension device has a pair of ends wherein one end of the tension device is fixedly or pivotably mounted on a rear mount on the rear connecting frame, and the other end of the tension device is fixedly or pivotably mounted on a seat tube extension on the seat tube. The tension device is pivotally mounted to both the rear connecting frame and the seat tube, so the tension device has a freedom of movement to move about and also tilts during a turn, easily accommodating the motion of the front frame to rotate around a longitudinal axis of the rear connecting frame.

The tricycle has the front wheel held by a front fork rotatably attached to a head tube attached to the front frame. The handlebar with a pair of handles is rotatably attached to the head tube.

The tricycle also has a crank housing attached to the seat tube and to the rear connecting frame. The crank housing has a pair of ends such that a pair of crank arms protrude from the two ends of the crank housing, one crank arm from each end of the crank housing. A pair of pedals are attached to the two crank arms, one pedal to each crank arm.

The rear frame has a left extension and a right extension so that the left wheel is rotatably attached to the left extension, and the right wheel is rotatably attached to the right extension. The tricycle also has a front chain wheel rotatably attached to the crank housing and a rear chain wheel rotatably attached to the rear frame between the left extension and the right extension. A chain (or chain links) is slidably attached to the front chain wheel and slidably attached to the rear chain wheel, transferring power from the pedals to the left and right wheels. A rear axle may be placed between the left wheel and the right wheel, and the rear chain wheel is then placed on the rear axle.

As an improvement to the tricycle, the longitudinal axis with its imaginary extension of the longitudinal axis points to a front-wheel-to-ground-contact point on the front wheel. The front-wheel-to-ground-contact point on the front wheel is a contact point of the front wheel with the ground when the tricycle is on the ground.

Another version of the tricycle has the front connecting frame that is slidably attached to the rear connecting frame to slide along a longitudinal axis of the rear connecting frame and is also rotatably attached to the rear connecting frame to rotate radially around the longitudinal axis of the rear connecting frame. The rear connecting frame may be designed with a tubular structure that slidably and rotatably accepts the front connecting frame within the tubular structure to accommodate the front connecting frame sliding along a longitudinal axis and rotating radially around the longitudinal axis of the rear connecting frame.

The tricycle in one of the versions may be designed so that the rear connecting frame inserted in the front connecting frame is exposed on both ends of the front connecting frame. To safely allow the longitudinal slide and to allow greater movement of freedom for the rear connecting frame within the front connecting frame, the rear connecting frame inserted in the front connecting frame is exposed on both ends of the front connecting frame, such that the rear connecting frame towards the front wheel is exposed at least one inch out of the front connecting frame, and the rear connecting frame towards the left wheel and the right wheel (that is, towards the rear) is exposed at least one inch out of the front connecting frame. An alternate design that has the front connecting frame inserted in the rear connecting frame is exposed on both ends of the rear connecting frame is also envisioned.

These and other features, aspects, and advantages of the tricycle will become better understood with reference to the accompanying specification, writing, drawings, and submission, all of which are incorporated herein.

BRIEF DESCRIPTION OF THE DRAWINGS

These and other features, aspects, and advantages of the tricycle will become better understood with reference to the accompanying drawings, wherein.

DETAILED DESCRIPTION EMBODIMENTS OF THE INVENTION

A tricycle is described in detail as shown in the Figs.

Figure 1:
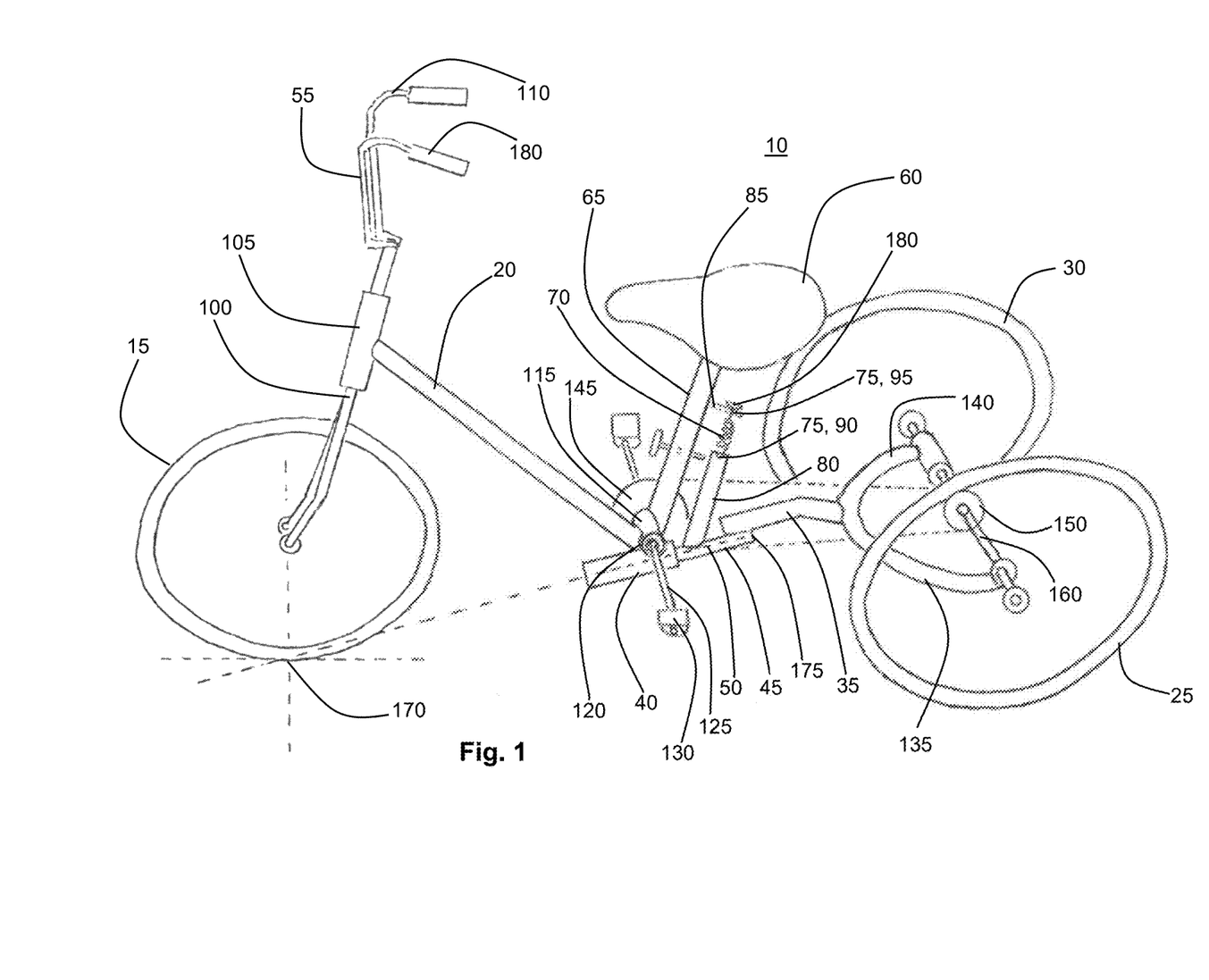
FIG. 1 shows the tricycle as presented herein.

FIG. 1 shows a tricycle 10 has a front wheel 15 attached to a front frame 20, and a left wheel 25 and a right wheel 30 attached to a rear frame 35. The front frame 20 is attached to a front connecting frame 40, and the rear frame 35 is attached to a rear connecting frame 45. The front connecting frame 40 is rotatably attached to the rear connecting frame 45 to rotate around a longitudinal axis 50 of the rear connecting frame 45. The use of either or both bearings and grease for rotation of parts is common knowledge in the industry and should be left to the design choice. The tricycle 10 also has a handlebar 55 rotatably connected to the front frame 20 and a seat 60 connected to a seat tube 65.

The tricycle 10 has the seat tube 65 attached to the front connecting frame 40, wherein a tension device 70 (such as a spring, a shock absorber, or other elasticity providing devices) is attached to the rear connecting frame 45 and to the seat tube 65. More specifically, the tension device 70 has a pair of ends 75 wherein one end 75 of the tension device is fixedly or pivotably mounted on a rear extension 80 on the rear connecting frame 45, and the other end 75 of the tension device is fixedly or pivotably mounted on a seat tube extension 85 on the seat tube 65. The tension device 70 is pivotally mounted to both the rear connecting frame 45 and the seat tube 65, so the tension device 70 has a freedom of movement to move about and also freely tilts during a turn, easily accommodating the motion of the front frame 20 to rotate around a longitudinal axis 50 of the rear connecting frame 45. The tension device 70 may be mounted pivotally to the rear connecting frame 45 and the seat tube 65 by the tension device 70 having a hook 90 connected to a ring 95 on either or both the seat tube extension 85 and the rear extension 80. Of course, as an alternative design, the tension device 70 may have one or more rings, and either or both the ends of the tension device may have hooks.

It should be noted that the front frame 20 includes a front fork 100 and a head tube 105 as its connected parts, and therefore the tension device 70 being attached to the front connecting frame 40 may be accomplished by various versions, including but not limited to, the tension device 70 attached to the front frame 20 or the head tube 105. Also, it should be noted that the rear connecting frame 45 has the rear extension 80 as its connected parts, and therefore the tension device 70 attached to the rear frame 35 or to the rear extension 80 may include a version that has the tension device 70 attached to anywhere on the rear connecting frame 45, the rear frame 35, and even on either or both a left extension 135 of the rear frame or a right extension 140 of the rear frame The tension device 70, with its elasticity, helps to pull and restore the handlebar 55 and the front wheel 15 to the original free-standing position of the tricycle 10 after a turn is completed, and helps the user balance better on the tricycle 10.

The tricycle 10 has the front wheel 15 held by a front fork 100 attached to a head tube 105 attached to the front frame 20. The handlebar 55 with a pair of handles 110 is rotatably attached to the head tube 105. The handlebar 55 shown is substantially in a shape of a "U" with the upper portion of the "U" shape having a wider spread, but various designs of the handlebar 55 may be implemented, such as a substantially flat tube-shaped handlebar 55.

The tricycle 10 also has a crank housing 115 attached to the seat tube 65 and to the front connecting frame 40. The crank housing 115 has a pair of ends such that a pair of crank arms protrude from the two ends 120 of the crank housing 115, one crank arm 125 from each end 120 of the crank housing 115. A pair of pedals 130 are attached to the two crank arms 125, one pedal 130 to each crank arm 125. Each pedal 130 should be freely rotatable around its attached crank arm 125.

The rear frame 35 has a left extension 135 and a right extension 140 so that the left wheel 25 is rotatably attached to the left extension 135, and the right wheel 30 is rotatably attached to the right extension 140. The tricycle 10 also has a front chain wheel 145 rotatably attached to the crank housing 115 and a rear chain wheel 150 rotatably attached to the rear frame 35 between the left extension 135 and the right extension 140. A chain 155 (or chain links) is slidably attached to the front chain wheel 145 and slidably attached to the rear chain wheel 150, transferring power from the pedals 130 to the left and right wheels 25, 30. A rear axle 160 may be placed between the left wheel 25 and the right wheel, 30, and the rear chain wheel 150 is then placed on the rear axle 160.

As an improvement to the tricycle 10, the longitudinal axis 50 with its imaginary extension 165 of the longitudinal axis 50 points to a front-wheel-to-ground-contact point 170 on the front wheel 15. The front-wheel-to-ground-contact point 170 on the front wheel 15 is a contact point of the front wheel 15 with the ground when the tricycle 10 is on the ground when the tricycle 10 is free-standing (that is, when not being ridden.) The applicant believes the optimal performance of the tricycle 10 occurs (that is, the centrifugal force from turning of the tricycle 10 is best reduced; that is, the centrifugal force from turning of the tricycle 10 is best transferred to the ground) when the imaginary extension 165 of the longitudinal axis 50 points to the front-wheel-to-ground-contact point 170 on the front wheel 15 when the tricycle 10 is static. When the tricycle 10 is making a turn, the longitudinal axis 50 with its imaginary extension 165 of the longitudinal axis 50 may no longer point to the front-wheel-to-ground-contact point 170 on the front wheel 15.

Another version of the tricycle 10. The tricycle 10 has the front connecting frame 40 that is slidably attached to the rear connecting frame 45 to slide along a longitudinal axis 50 of the rear connecting frame 45 is also rotatably attached to the rear connecting frame 45 to rotate radially around the longitudinal axis 50 of the rear connecting frame 45. The front connecting frame 40 may be designed with a tubular structure that slidably and rotatably accepts the rear connecting frame 45 within the tubular structure to accommodate the rear connecting frame 45 sliding along a longitudinal axis 50 and rotating radially around the longitudinal axis 50 of the front connecting frame 40. Although not shown, a tubular structure of the front connecting frame 40 may be a hollow tube that allows the front rear frame 45 to be inserted and slide along its longitudinal axis 50. The rear connecting frame 45 that is slidably attached to the front connecting frame 40 to slide along a longitudinal axis 50 of the rear connecting frame 45 should be fixedly adjustable so that the rear connecting frame 45 may slide and fixedly attached incrementally to the front connecting frame 40.

Figure 3:
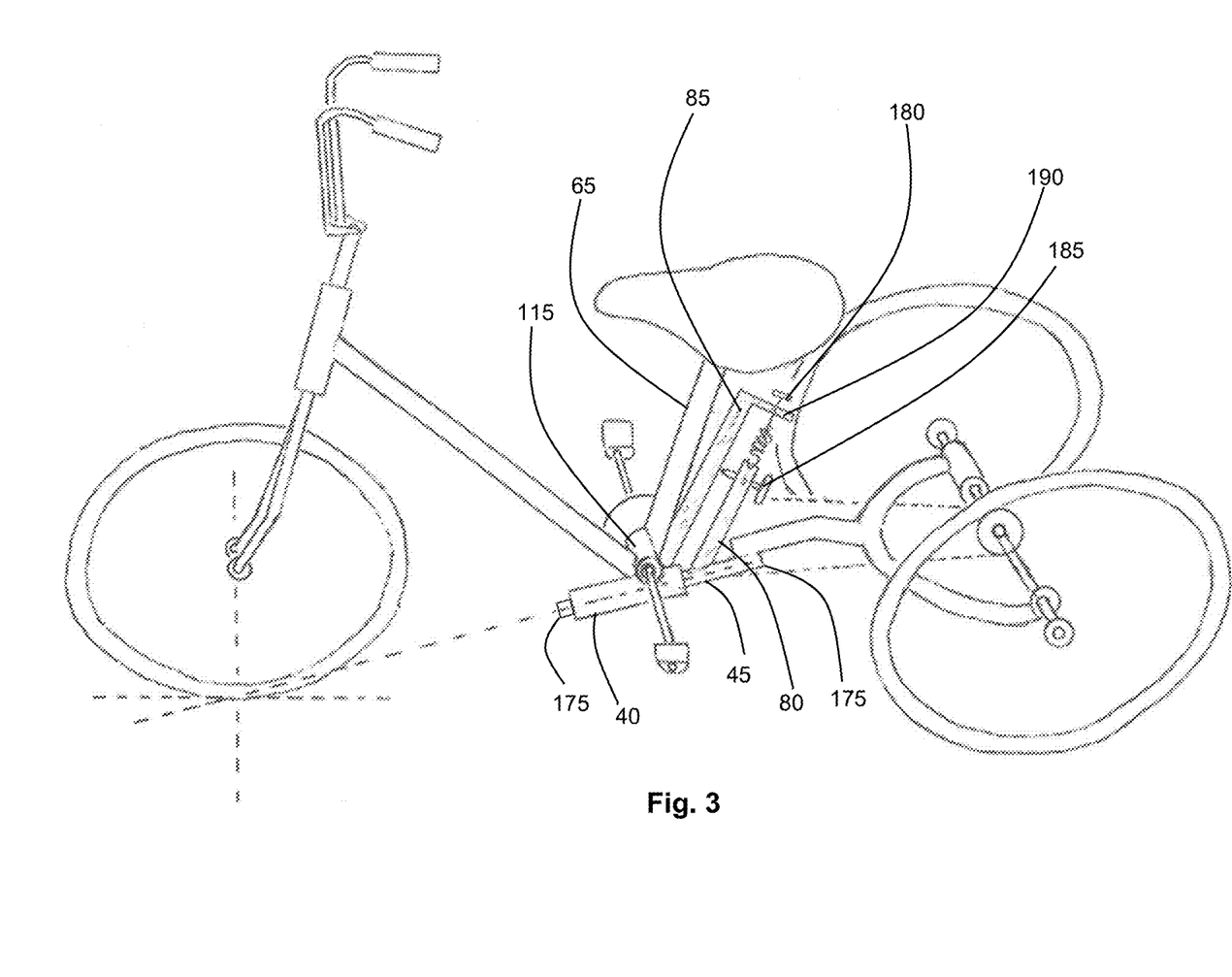
FIG. 3 shows a variation of the tricycle as presented herein.

The tricycle 10 in this version may be designed so that the rear connecting frame 45 inserted in the front connecting frame 40 is exposed on both ends 175 of the front connecting frame 40 (better shown in FIG. 3). To safely allow the longitudinal slide and to allow greater movement of freedom for the rear connecting frame 45 within the front connecting frame 40, the rear connecting frame 45 inserted in the front connecting frame 40 is exposed on both ends 175 of the front connecting frame 40, such that the rear connecting frame 45 towards the front wheel 20 is exposed at least one inch out of the front connecting frame 40, and the rear connecting frame 45 towards the left wheel 25 and the right wheel 30 is exposed at least one inch out of the front connecting frame 40.

The applicant believes that having both the sliding and rotating motions of the front connecting frame 40 in relation to the rear connecting frame 45 may receive a greater benefit from the tilting (leaning) tricycle 10, as disclosed herein, during a turn. The sliding movement may allow the longitudinal axis 50 with its imaginary extension 165 of the longitudinal axis 50 be manually adjusted to optimally point to the front-wheel-to-ground-contact point 170 before or after a ride. The manual adjustments may be made by sliding the rear connecting frame 45 along the front connecting frame 40 and affixing it with a bolt, a knob, a pin, a lever, or other commonly available industry device (not shown.)

Figure 2:
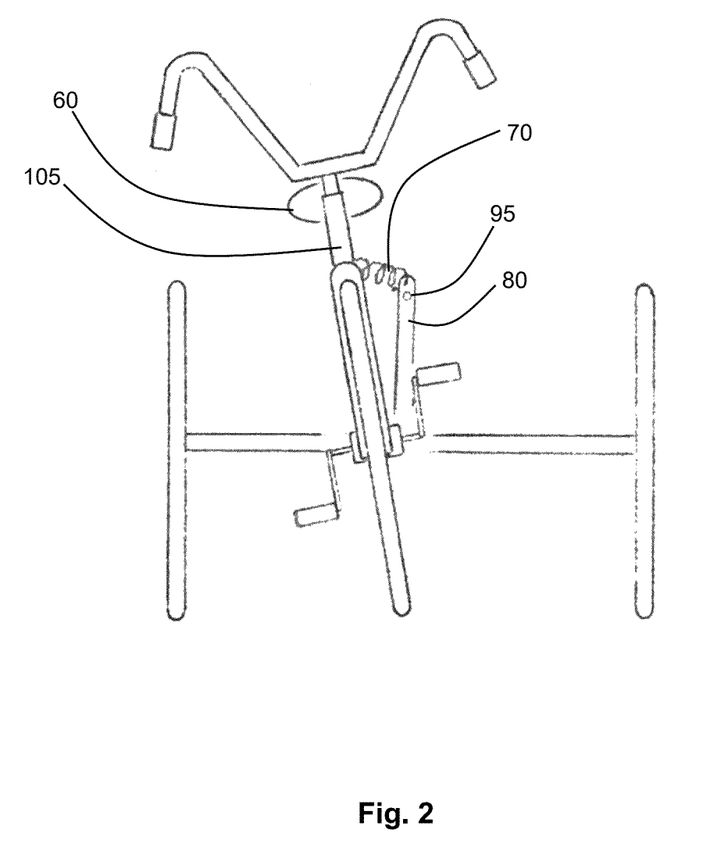
FIG. 2 shows the tricycle with the handles, the head tube, the front fork, the front frame, and the front wheel tilted in response to the centrifugal force during a turn.

FIG. 2 shows the front parts of the tricycle 10 leaning (that is, tilted) during a turn. As shown, the tricycle 10 has the handle 110, the head tube 105, the front fork 100, the front wheel 15, and the head tube 105, along with the front part of the frame (that is, the front frame 20), leaning (that is, tilted) in response to the centrifugal force applied to the tricycle 10. Contrast to the head tube 105 and the front wheel 15 leaning, the rear extension 80 attached to the rear connecting frame 45 is not leaning, providing stability of the user on the seat 60. Instead of having much of (if not all of) the centrifugal force exerted sideways to the rider and the bicycle, making the tricycle unstable, the tricycle 10 presented herein transfers a significant part of the centrifugal force to the ground by enabling the front part of the tricycle to be leaning (tilted), independent of the user on the seat 60, as with a bicycle during the turn.

FIG. 3 shows a variation of the tricycle 10 with the seat tube 65 attached to the front connecting frame 40 through the crank housing 115, wherein a tension device 70 is attached to the rear connecting frame 45 through the rear extension 80 and to the seat tube 65 through the seat tube extension 85. More specifically, the tension device 70 has a pair of ends 75 wherein one end 75 of the tension device 70 is mounted on a seat tube extension 85 on the seat tube 65, and the other end 75 of the tension device is mounted on the rear extension 80 on the rear connecting frame 45. A handgrip 180 is used to loosen or to tighten the tension of the tension device 70 located at either end of the tension device 70. The handgrip 180 may be a lever, a bar, a knob, a bolt, or other industry common device to loosen and to tighten to affix the tension device 70, including the use of a handheld tool to adjust the tension of the tension device 70.

FIG. 3 also shows a variation of the tricycle 10 with the seat tube extension 85 attached to both the seat tube 65 and the front connecting frame 40. Also, as shown the seat tube extension 85 may be attached to the crank housing 115 as solid connection to the seat tube 65, the front connecting frame 40, and the crank housing 115. In this configuration, because the seat tube extension 85 is also attached to either or both the crank housing 115 and the rear connecting frame 40, the seat tube extension 85 rises up from the crank housing in the similar direction along the seat tube 65.

Also shown in FIG. 3 is an adjusting knob 185 at the second end of the tension device 70. FIG. 3 also shows that the seat tube extension 85 has a cantilevered bar 190 to which one end of the tension device 75 is attached so that hand grip 180 can easily be accessed to adjust the tension of the tension device 70 or to securely affix the tension device 75 to the rear extension 80. By using both the hand grip 180 and the adjusting knob, the elasticity and the strength of the tension device 70 can be easily adjusted to best fit the user variables, including but not limited to the user's weight, center of gravity, riding style, and aggressiveness in riding, as well as the variations in the terrain (ground).

FIG. 3 also shows the rear connecting frame 45 inserted in the front connecting frame 40 is exposed on both ends 175 of the front connecting frame 40.

Figure 4:
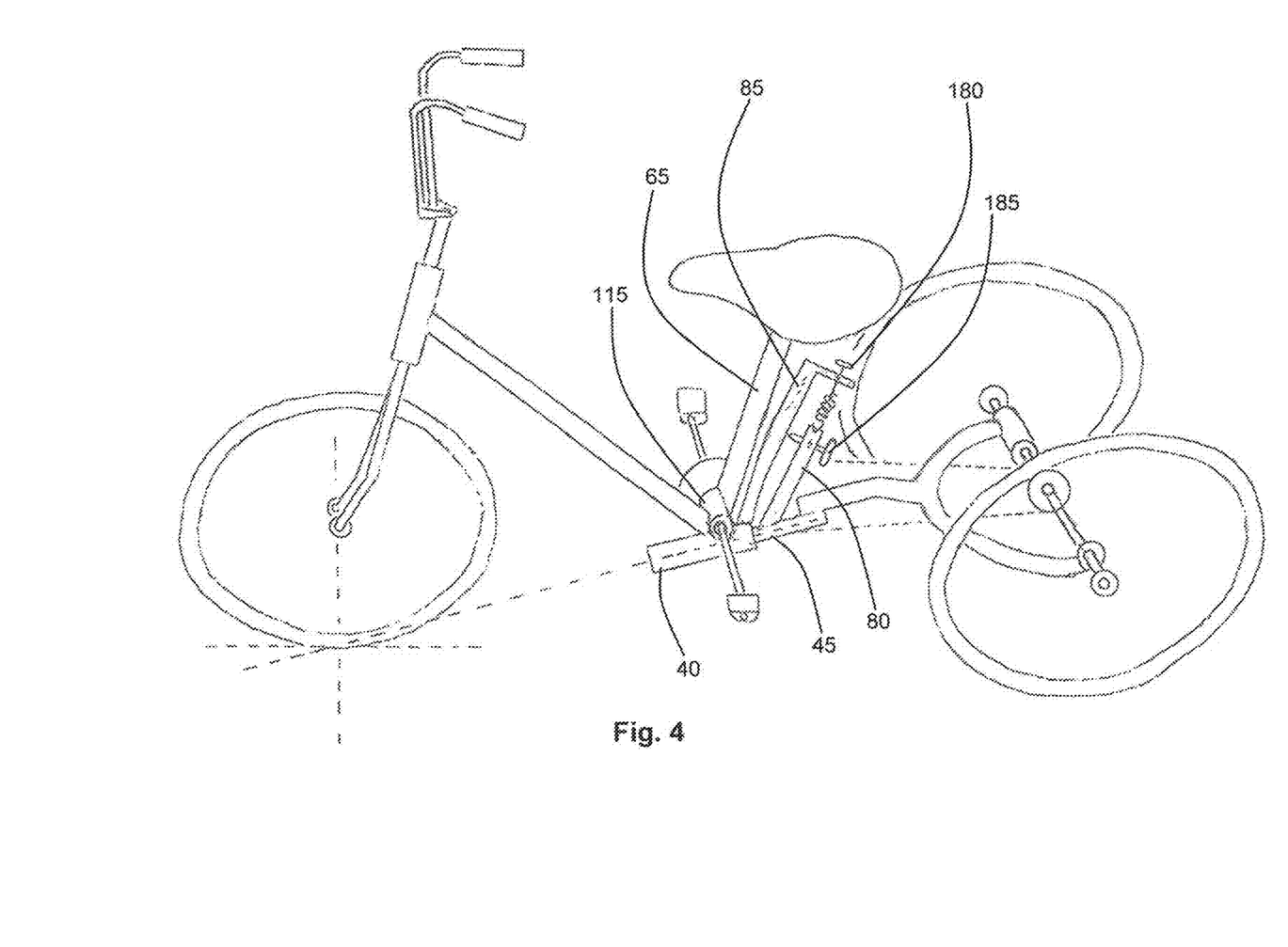
FIG. 4 shows another variation of the tricycle as presented herein.

FIG. 4 shows another variation of the tricycle 10 with the seat tube 65 attached to the front connecting frame 40 through the crank housing 115, wherein a tension device 70 is attached to the rear connecting frame 45 through the rear extension 80 and to the seat tube 65 through the seat tube extension 85, with an exception that the seat tube extension is not attached to the seat tube 65 but to the front connecting frame 40. In this variation, the seat tube extension 85, because it is not attached to the seat tube, may have different slope (skewed from the direction/slope of the seat tube 65) from the seat tube 65, leaning more forward (a bit toward the head tube) or backward (a bit toward the rear chain wheel 150) from the seat tube 65.

Figure 5:
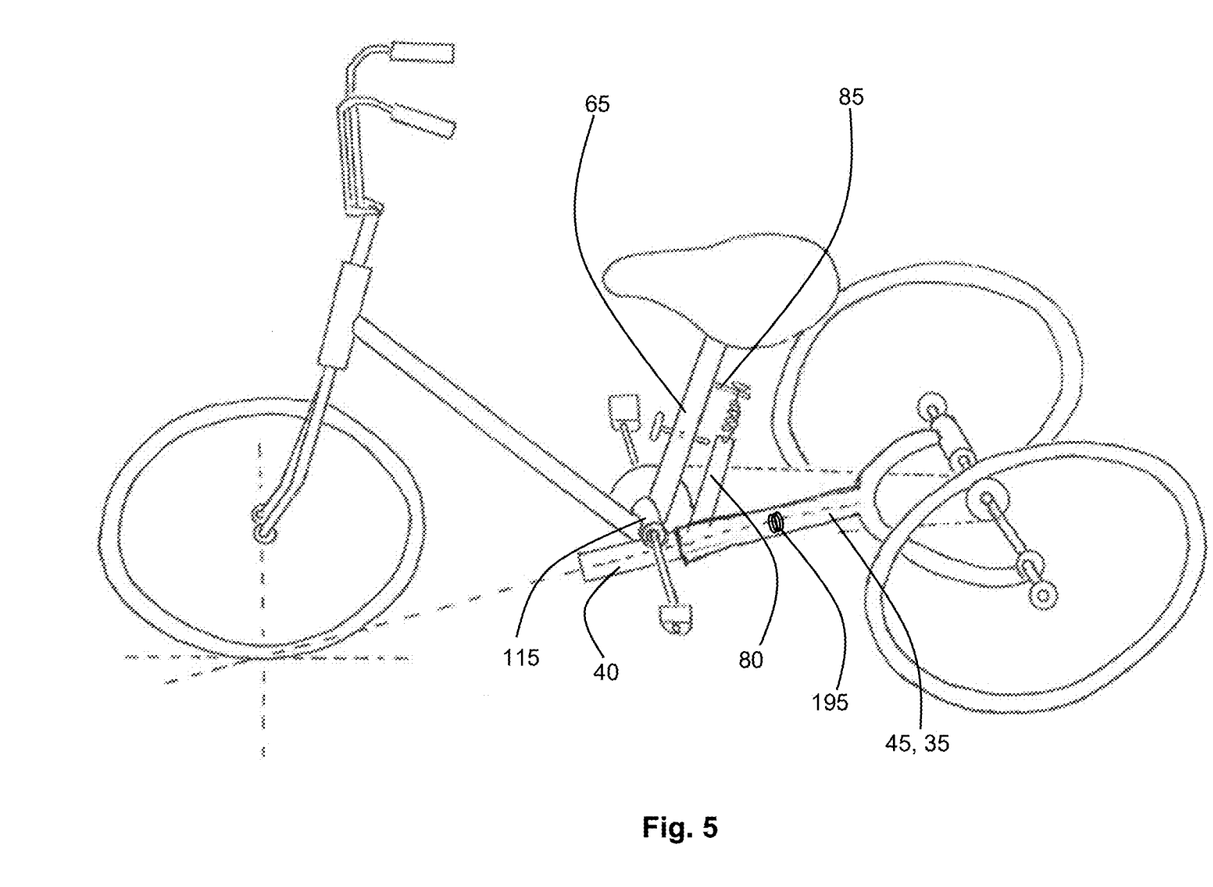
FIG. 5 shows another variation of the tricycle as presented herein.

FIG. 5 shows another version of the tricycle 10. The tricycle 10 has the front connecting frame 40 that is slidably attached to the rear connecting frame 45 to slide along a longitudinal axis 50 of the rear connecting frame 45, the front connecting frame 40 is also rotatably attached to the rear connecting frame 45 to rotate radially around the longitudinal axis 50 of the rear connecting frame 45. The rear connecting frame 45 is designed with a tubular structure that slidably and rotatably accepts the front connecting frame 40 within the tubular structure to accommodate the front connecting frame 40 sliding along a longitudinal axis 50 and rotating radially around the longitudinal axis 50 of the rear connecting frame 45. Although not shown, a tubular structure of the rear connecting frame 45 may be a hollow tube that allows the front connecting frame 40 to be inserted and slide along its longitudinal axis 50. The rear connecting frame 45 may be connected to the front connecting frame 40 with an elastic device 195 inside the hollow tube to cushion and to hold the front connecting frame 40 in place. The front connecting frame 40 that is slidably attached to the rear connecting frame 45 to slide along a longitudinal axis 50 of the rear connecting frame 45 should be fixedly adjustable so that the front connecting frame 40 may slide and fixedly attached incrementally in the rear connecting frame 45.

While the description, drawings, and references have presented, shown, and described with reference to different embodiments thereof, it will be appreciated by those skilled in the art that variations in form, detail, compositions, and operation may be made without departing from the spirit and scope of the disclosure. As an example, instead of having the cantilevered bar 190, the seat tube extension 85 may have an arc shape (not shown) so an end of the arc is used to attach one end of the tension device 75 and the hand grip 180 to easily access and to adjust the tension of the tension device 70.

What is claimed is:
1. A tricycle comprising: a front wheel attached to a front frame, and a left wheel and a right wheel attached to a rear frame, wherein the front frame is attached to a front connecting frame and the rear frame is attached to a rear connecting frame, wherein the front connecting frame is rotatably attached to the rear connecting frame to rotate around a longitudinal axis of the rear connecting frame,
wherein the tricycle further comprising a seat tube attached to the front connecting frame,
wherein a tension device is attached to the rear connecting frame and to the seat tube, and wherein the tricycle further comprises a handlebar rotatably connected to the front frame and a seat connected to the seat tube,
wherein the longitudinal axis, with an imaginary extension of the longitudinal axis, points to a front-wheel-to-ground-contact point on the front wheel,
wherein the front-wheel-to-ground-contact point on the front wheel is a contact point of the front wheel with a ground when the tricycle is placed on the ground, and
wherein the tension device has a pair of ends wherein one end of the tension device is fixedly mounted on a lower mount on a rear extension attached to the rear connecting frame, and the other end of the tension device is mounted on a seat tube extension attached to the seat tube.

2. The tricycle of claim 1, wherein the front wheel is held by a front fork rotatably attached to a head tube attached to the front frame, the handlebar is rotatably attached to the head tube, and wherein the handlebar has a pair of handles.

3. The tricycle of claim 2 further comprising a crank housing attached to the seat tube and to the front connecting frame, wherein the crank housing has a pair of ends, wherein a pair of crank arms protrude from the two ends of the crank housing, one crank arm from each end of the crank housing, and wherein a pair of pedals are attached to the two crank arms, one pedal to each crank arm.

4. The tricycle of claim 3 wherein the rear frame has a left extension and a right extension wherein the left wheel is rotatably attached to the left extension, and the right wheel is rotatably attached to the right extension, and wherein the tricycle further comprises a front chain wheel rotatably attached to the crank housing and a rear chain wheel rotatably attached to the rear frame between the left extension and the right extension, wherein the tricycle further comprising a chain slidably attached to the front chain wheel and slidably attached to the rear chain wheel, and wherein the tricycle further comprises of a rear axle placed between the left wheel and the right wheel and the rear chain wheel is placed on the rear axle.

5. A tricycle comprising: a front wheel attached to a front frame, and a left wheel and a right wheel attached to a rear frame, wherein the front frame is attached to a front connecting frame and the rear frame is attached to a rear connecting frame,
wherein the front connecting frame is rotatably attached to the rear connecting frame to rotate around a longitudinal axis of the rear connecting frame,
wherein the tricycle further comprising a seat tube attached to the front connecting frame,
wherein a tension device is attached to the rear connecting frame and to the seat tube, and wherein the tricycle further comprises a handlebar rotatably connected to the front frame and a seat connected to the seat tube, and
the tricycle wherein the rear connecting frame is inserted into the front connecting frame, and wherein the rear connecting frame rotates inside the front connecting frame.

6. The tricycle of claim 5 wherein the longitudinal axis, with an imaginary extension of the longitudinal axis, points to a front-wheel-to-ground-contact point on the front wheel, wherein the front-wheel-to-ground-contact point on the front wheel is a contact point of the front wheel with a ground when the tricycle is placed on the ground.

7. The tricycle of claim 5, wherein the tension device has a pair of ends wherein one end of the tension device is fixedly mounted on a lower mount on a rear extension attached to the rear connecting frame, and the other end of the tension device is mounted on a seat tube extension attached to the seat tube, and wherein the front wheel is held by a front fork rotatably attached to a head tube attached to the front frame, the handlebar is rotatably attached to the head tube, and wherein the handlebar has a pair of handles.

8. The tricycle of claim 7 further comprising a crank housing attached to the seat tube and to the front connecting frame, wherein the crank housing has a pair of ends, wherein a pair of crank arms protrude from the two ends of the crank housing, one crank arm from each end of the crank housing, and wherein a pair of pedals are attached to the two crank arms, one pedal to each crank arm, wherein the rear frame has a left extension and a right extension wherein the left wheel is rotatably attached to the left extension, and the right wheel is rotatably attached to the right extension, wherein the tricycle further comprises a front chain wheel rotatably attached to the crank housing and a rear chain wheel rotatably attached to the rear frame between the left extension and the right extension, wherein the tricycle further comprising a chain slidably attached to the front chain wheel and slidably attached to the rear chain wheel, and wherein the tricycle further comprises a rear axle placed between the left wheel and the right wheel and the rear chain wheel is placed on the rear axle.

9. The tricycle of claim 1, wherein the rear frame and the rear connecting frame are made of a contiguous single piece without any joints that join the rear frame and the rear connecting frame, and wherein the front wheel is held by a front fork rotatably attached to a head tube attached to the front frame, the handlebar is rotatably attached to the head tube, and wherein the handlebar has a pair of handles.

10. The tricycle of claim 9 further comprising a crank housing attached to the seat tube and to the front connecting frame, wherein the crank housing has a pair of ends, wherein a pair of crank arms protrude from the two ends of the crank housing, one crank arm from each end of the crank housing, and wherein a pair of pedals are attached to the two crank arms, one pedal to each crank arm, and wherein the rear frame has a left extension and a right extension wherein the left wheel is rotatably attached to the left extension, and the right wheel is rotatably attached to the right extension, and wherein the tricycle further comprises of a front chain wheel rotatably attached to the crank housing and a rear chain wheel rotatably attached to the rear frame between the left extension and the right extension, wherein the tricycle further comprising a chain slidably attached to the front chain wheel and slidably attached to the rear chain wheel, and wherein the tricycle further comprises of a rear axle placed between the left wheel and the right wheel and the rear chain wheel is placed on the rear axle.

11. The tricycle of claim 1, wherein one end of the tension device is fixedly mounted on a lower mount on a rear extension attached to the rear connecting frame, and the other end of the tension device is mounted on a seat tube extension, wherein the seat tube extension is attached to the seat tube and to the front connecting frame.

12. The tricycle of claim 11, wherein the front wheel is held by a front fork rotatably attached to a head tube attached to the front frame, the handlebar is rotatably attached to the head tube, and wherein the handlebar has a pair of handles.

13. The tricycle of claim 12 further comprising a crank housing attached to the seat tube and to the front connecting frame, wherein the crank housing has a pair of ends, wherein a pair of crank arms protrude from the two ends of the crank housing, one crank arm from each end of the crank housing, and wherein a pair of pedals are attached to the two crank arms, one pedal to each crank arm, and wherein the rear frame has a left extension and a right extension wherein the left wheel is rotatably attached to the left extension, and the right wheel is rotatably attached to the right extension, and wherein the tricycle further comprises of a front chain wheel rotatably attached to the crank housing and a rear chain wheel rotatably attached to the rear frame between the left extension and the right extension, wherein the tricycle further comprising a chain slidably attached to the front chain wheel and slidably attached to the rear chain wheel, and wherein the tricycle further comprises of a rear axle placed between the left wheel and the right wheel and the rear chain wheel is placed on the rear axle.

14. A tricycle comprising a front wheel attached to a front frame, and a left wheel and a right wheel attached to a rear frame,
   wherein the front frame is attached to a front connecting frame, and the rear frame is attached to a rear connecting frame,
   wherein the front connecting frame is slidably attached to the rear connecting frame to slide along a longitudinal axis of the rear connecting frame, and is also rotatably attached to the rear connecting frame to rotate radially around the longitudinal axis of the rear connecting frame,
   wherein the rear connecting frame is connected to the front connecting frame with an elastic device inside the rear connecting frame to cushion and to hold the front connecting frame in place,
   wherein the front connecting frame has a tubular structure that slidably and rotatably accepts the rear connecting frame within the tubular structure,
   wherein the tricycle further comprising a seat tube attached to the rear frame,
   wherein a tension device is attached to the front frame and to the seat tube,
   wherein the tricycle further comprises a handlebar rotatably connected to the front frame and a seat connected to the seat tube,
   wherein the tension device has a pair of ends wherein one end of the tension device is mounted on a seat tube extension attached to the seat tube and the other end of the tension device is mounted on a rear extension attached to the rear connecting frame,
   wherein the front wheel is held by a front fork rotatably attached to a head tube attached to the front frame, the handlebar is rotatably attached to the head tube, and wherein the handlebar comprises a pair of handles,
   wherein the tricycle further comprising a crank housing attached to the seat tube and to the rear connecting frame, wherein the crank housing has a pair of ends, wherein a pair of crank arms protrude from the two ends of the crank housing, one crank arm from each end of the crank housing, and wherein a pair of pedals are attached to the two crank arms, one pedal to each crank arm, and
   wherein the rear frame has a left extension and a right extension wherein the left wheel is rotatably attached to the left extension, and the right wheel is rotatably attached to the right extension.

15. The tricycle of claim 14 wherein the tricycle wherein the front connecting frame is inserted into the rear connecting frame, and wherein the front connecting frame rotates inside the rear connecting frame.

* * * * *